3,417,077
ERYTHROMYCIN DERIVATIVE AND PROCESS
FOR THE PREPARATION THEREOF
Hubert W. Murphy, Verlin C. Stephens and James W.
Conine, Indianapolis, Ind., assignors to Eli Lilly and
Company, Indianapolis, Ind., a corporation of Indiana
Filed May 16, 1966, Ser. No. 550,276
9 Claims. (Cl. 260—210)

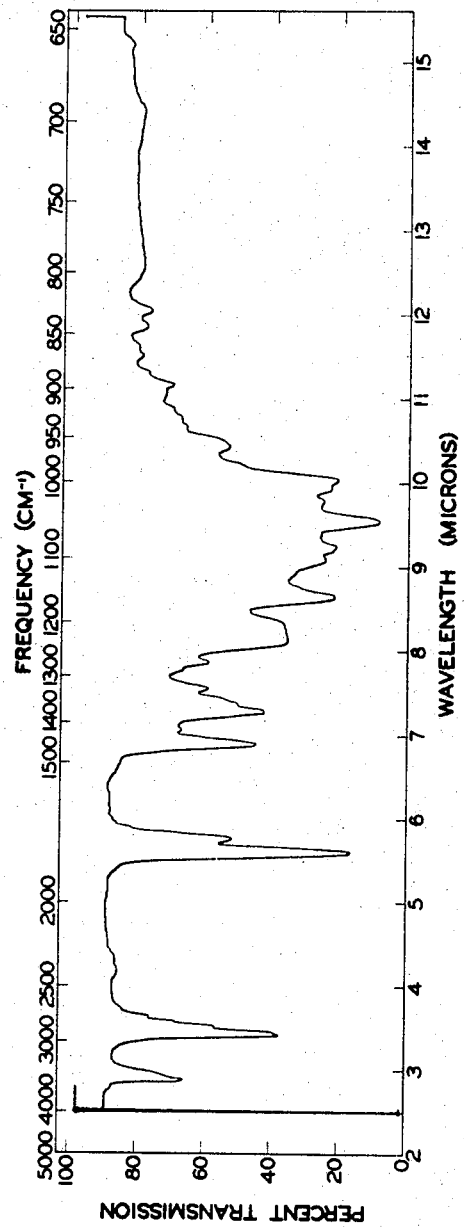

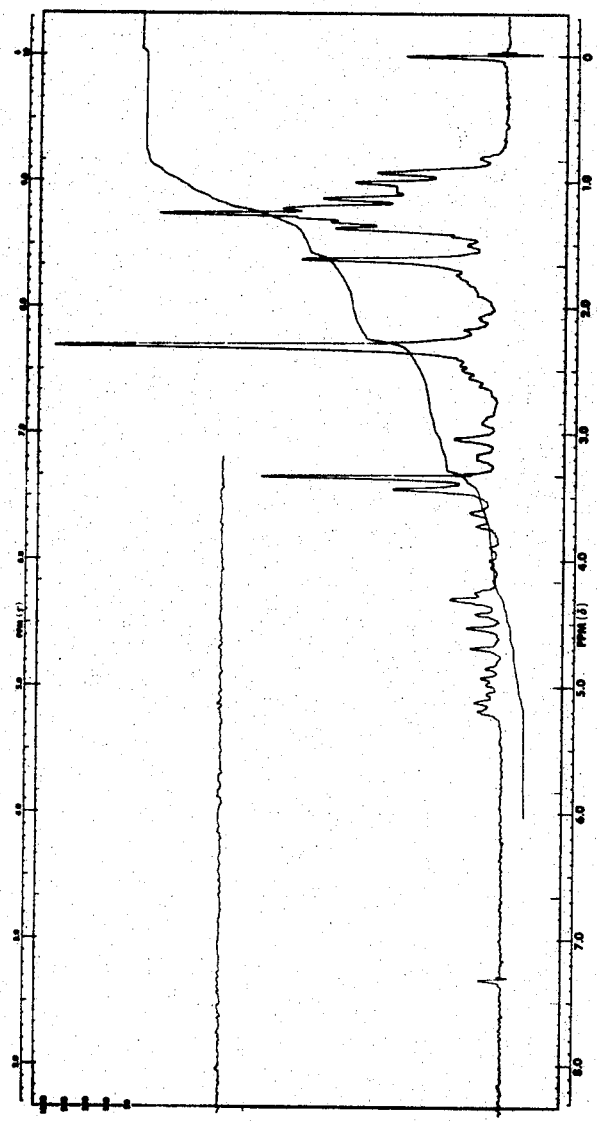
FIG. 2 NUCLEAR MAGNETIC RESONANCE SPECTRUM OF ERYTHROMYCIN CARBONATE.

ABSTRACT OF THE DISCLOSURE

A cyclic carbonate ester of erythromycin prepared by the reaction of erythromycin with ethylene carbonate in an inert solvent medium, optionally and preferably in the presence of an inorganic base or an alkali metal cyanide, cyanate, thiocyanate, chloride, bromide, or iodide.

The instant esters of erythromycin are very active antibiotic agents.

---

This invention relates to a novel antibiotic substance and to a process for the preparation thereof. More particularly, this invention relates to a novel derivative of erythromycin and its preparation.

Erythromycin is a macrolide antibiotic produced by certain strains of Streptomyces erythreus. The structure of erythromycin is represented by the following formula:

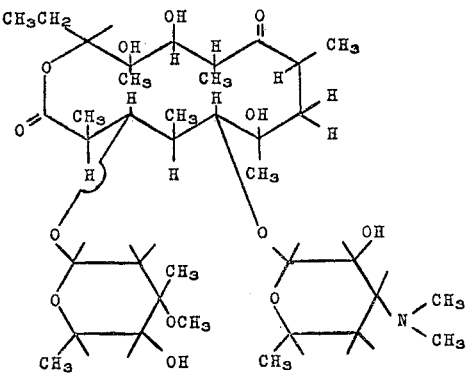

Inspection of the above structure reveals that erythromycin can be considered as comprising three major fragments—a sugar fragment which is known as cladinose, a basic amino sugar, known as desosamine, and a many membered ring which will be referred to herein as the macrolide ring.

Numerous derivatives of erythromycin have been prepared in an effort to enhance the desirable properties of the antibiotic. Some of these derivatives have achieved wide-spread commercial acceptance. None of the derivatives, however, has involved any significant modification of the macrolide ring portion of the erythromycin molecule.

It has now been discovered that a valuable new derivative of erythromycin in which the macrolide ring of the erythromycin molecule has been significantly altered can be conveniently prepared by the reaction, under suitable conditions, of erythromycin with ethylene carbonate.

Although the structure of the newly discovered derivative of erythromycin has not been established with certainty, the best available evidence suggests the following probable structure:

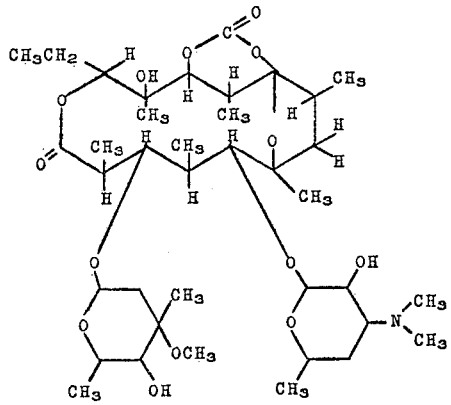

The available data do not permit of a choice between the above-indicated structure and a possible alternate structure in which the carbonate group occupies the position of the oxygen bridge across the macrolide ring. For convenience, the new derivative will be designated herein as erythromycin carbonate.

The novel antibiotic agent provided by this invention is a white crystalline solid melting at about 225–227° C. It is soluble in aromatic hydrocarbons such as benzene, toluene, xylene and the like, and insoluble in aliphatic and cycloaliphatic hydrocarbons. The compound is soluble to the extent of about 1 percent in refluxing ether but is insoluble in cold ether. Erythromycin carbonate dissolves in water to the extent of about 15 mg. per liter.

Electrometric titration of erythromycin carbonate in aqueous 66 percent dimethylformamide indicates the presence of one titratable group of pK'a 8.55.

The specific optical rotation, $[\alpha]_D^{25}$, of crystalline erythromycin carbonate is about $-53°$ when the concentration of the compound is 2 percent in dioxane solution.

The infrared absorption spectrum of erythromycin carbonate as a chloroform solution is shown as FIGURE 1 in the accompanying drawings. The observed values of the distinguishable bands in the infrared spectrum over the range of 2 to 15 microns are as follows: 2.88, 3.42, 3.45, 3.52, 3.58, 3.63, 5.59, 5.75, 6.89, 7.06, 7.27, 7.36, 7.55, 7.77, 7.86, 8.2, 8.65, 9.08, 9.23, 9.54, 9.78, 9.93, 10.03, 10.42, 10.66, 10.75, 10.87, 11.15, 11.30, 11.50, 11.85, and 12.04 microns.

A powder X-ray diffraction pattern of the new antibiotic, using nickel-filtered copper radiation and a wave length value of 1.5405 A. in calculating the interplanar spacings, gives the following values:

| "d": | $I/I_1$ |
|---|---|
| 13.48 | .50 |
| 11.11 | .02 |
| 9.25 | .70 |
| 8.42 | 1.00 |
| 8.00 | .04 |
| 6.77 | .80 |
| 6.38 | .80 |
| 5.76 | .60 |
| 5.52 | .60 |
| 4.88 | .70 |
| 4.69 | .80 |
| 4.51 | .50 |
| 4.26 | .70 |
| 3.94 | .30 |
| 3.76 | .20 |
| 3.64 | .20 |
| 3.50 | .30 |
| 3.38 | .20 |
| 3.21 | .40 |
| 3.05 | .30 |
| 2.98 | .10 |
| 2.87 | .10 |
| 2.76 | .10 |
| 2.68 | .15 |
| 2.56 | .08 |
| 2.49 | .08 |
| 2.43 | .06 |
| 2.36 | .06 |
| 2.30 | .15 |
| 2.22 | .08 |
| 2.135 | .08 |
| 2.09 | .15 |
| 1.985 | .10 |
| 1.93 | .06 |
| 1.877 | .10 |
| 1.762 | .04 |
| 1.70 | .04 |

Microanalysis of a sample of crystalline erythromycin carbonate dried in vacuo at about 60° C. over phosphorus pentoxide indicates the following percentage composition: C, 60.33; H, 8.78; N, 1.81; O, 29.08 (by difference).

The molecular weight of the new erythromycin derivative determined from mass spectrometric data is about 760. The molecular weight values determined by nonaqueous titration of a number of samples of the derivative ranged between about 745–770.

The empirical formula which best fits all the above data is $C_{38}H_{65}NO_{14}$.

The nuclear magnetic resonance spectrum of erythromycin carbonate is shown as FIGURE 2 of the accompanying drawings.

The mass spectral data for erythromycin carbonate are shown in the following table. The data were obtained with a CEC 21–110B high resolution mass spectrometer manufactured by Consolidated Electrodynamics Corporation, Monrovia, Calif. The instrument was operated at 70 electron volts ionization potential and 8000 volts acceleration potential. The material was admitted to the ion source by means of a direct solid introduction device, the temperature of which was regulated at 160° C. The ion source temperature employed was 180° C.

The table shows integral mass/charge (m/e) values for those ions having mass/charge ratios greater than 130 and having peaks, the intensity of which is at least 3 percent that of the strongest peak. In the table the term "abundance" is used to denote the intensity of each peak, expressed as a percentage of the intensity of the strongest peak. The first value in the table is for the molecular ion, that is to say, the intact molecule minus one electron and, therefore, represents the molecular weight of the molecule.

| m/e ratio: | Abundance, percent |
|---|---|
| 759 | 8 |
| 742 | 3 |
| 741 | 3.5 |
| 697 | 3 |
| 686 | 4.5 |
| 601 | 8.5 |
| 600 | 6.5 |
| 585 | 9 |
| 584 | 24 |
| 572 | 3 |
| 566 | 3 |
| 443 | 5.5 |
| 414 | 3.5 |
| 410 | 9 |
| 409 | 19 |
| 371 | 4 |
| 243 | 4 |
| 221 | 5 |
| 200 | 4 |
| 179 | 6 |
| 176 | 4.5 |
| 175 | 11 |
| 174 | 77 |
| 162 | 16 |
| 159 | 7 |
| 158 | 100 |
| 157 | 5.5 |
| 156 | 9 |
| 144 | 6.5 |
| 142 | 19 |
| 141 | 4 |
| 140 | 5 |
| 137 | 6 |
| 131 | 86 |

The spectrum of activity of erythromycin carbonate against bacterial organisms is very similar to that seen with erythromycin except that the new antibiotic appears to be at least twice as active as erythromycin when the minimum inhibitory concentrations of the two antibiotics are compared. Erythromycin carbonate also shows activity against Eaton agent and against PPLO organisms. The new compound appears to be more stable in gastric juices than erythromycin and continues to show significant blood levels in dogs for as long as 24 hours after a single oral dose. The new antibiotic is also effective when administered parenterally.

The preparation of the new antibiotic derivative provided by this invention is readily accomplished by the reaction of erythromycin with an alkylene carbonate in a suitable inert solvent medium. Hydrocarbon solvents, especially aromatic hydrocarbon solvents, are preferred. A highly preferred solvent is benzene although other aromatic hydrocarbon solvents, such as toluene, xylene, and the like can be employed with excellent result. When ether is employed as the solvent medium, a considerably longer reaction time is necessary in order to obtain satisfactory yields of the desired derivative.

The reaction leading to the formation of erythromycin carbonate is accelerated by the presence of an inorganic base catalyst. A highly preferred catalyst is anhydrous potassium carbonate. Other inorganic bases such as sodium or potassium hydroxide, sodium carbonate, lithium carbonate, cesium carbonate, potassium bicarbonate, and the like can also be employed. Organic bases, particularly tertiary amine bases, such as triethanolamine and basic resins, such as, for example, Amberlite XE58, are also effective in accelerating the reaction. In addition, certain inorganic salts which are not normally considered to be bases are effective catalysts for the reaction. Among such suitable salts are the alkali metal cyanides, cyanates, thiocyanates, chlorides, bromides, and iodides. Illustrative of such salts are potassium cyanide, potassium cyanate, potassium thiocyanate, potassium chloride, potassium bromide, potassium iodide, sodium diodide, sodium thiocyanate, and the like. In general, however, the use of such other catalysts requires somewhat longer reaction times and may result in lower yields than when potassium carbonate is employed.

As is to be expected, the time and temperature variables are interdependent. The reaction is preferably carried out between about 70 and about 80° C., since ordinarily the reaction is substantially complete in one hour at the temperature of refluxing benzene when a catalyst is employed. The use of substantially higher temperatures such as those attainable in refluxing toluene and xylene generally results in considerable discoloration in the reaction mixture unless the reaction times are reduced. Lower temperatures, on the other hand, require substantially longer reaction times in order to achieve satisfactory yields. Thus, for example, at about 30° C. about three days are required to complete the reaction even when a catalyst is employed.

The amount of alkylene carbonate employed is not critical so long as a substantial excess over the theoretically required quantity is present. Thus, for example, yields appear to be adversely effected when less than 8 molar equivalents of alkylene carbonate are employed although amounts of carbonate greatly in excess of 8 molar equivalents do not appear to increase the yields appreciably.

Erythromycin carbonate by virtue of its basic amino group forms addition salts with both organic and inorganic acids. The said salts can be prepared from the free base by the methods conventionally employed for the preparation of addition salts of basic antibiotics.

Mono-ester derivatives of erythromycin carbonate and the acid addition salts thereof can be prepared by procedures analogous to those employed for the preparation of the esters and ester salts of the parent antibiotic, erythromycin. The latter esters and salts and the procedures for the preparation thereof are well known in the art. Illustrative of the esters of erythromycin carbonate which can be so prepared are the acetate, M.P. 213–215° C., the propionate, M.P. 219–220° C., the butyrate, M.P. 199–203° C., the valerate, M.P. 133–138° C., the succinate, M.P. 160–163° C., and the like. It will be recognized by those skilled in the art that such mono-ester derivatives of erythromycin carbonate and their acid addition salts are also within the scope of the present invention.

The following examples further illustrate the practice of the invention.

Example 1

A mixture of 100 g. of erythromycin, 50 g. of potassium carbonate, and 250 ml. of benzene is stirred vigorously at reflux temperature in an apparatus equipped with a condenser, water trap, dropping funnel and mechanical stirrer. A warm solution of 100 g. of ethylene carbonate in 250 ml. of anhydrous benzene is added to the stirred mixture during a one-hour interval. The reaction mixture is heated under reflux with stirring for an additional 15 minutes after all of the ethylene carbonate solution has been added. The mixture is cooled slightly and the clear supernatant solution is transferred to a separatory funnel. The residual slurry of potassium carbonate is dissolved in about 500 ml. of water and the resulting solution is employed to wash the decanted benzene solution. The separated benzene layer is then washed three times with a warm aqueous 5 percent sodium chloride solution. After a final wash with warm water the benzene solution is separated and the benzene is removed under reduced pressure on the steam bath. The residue is dissolved in ether and is again evaporated to dryness. Drying of the residue is completed in a vacuum oven. The dried gummy residue is dissolved in about 500 ml. of ether. Erythromycin carbonate crystallizes from the ether solution as a fine white crystalline powder. The air-dried product so obtained melts at about 200–222° C.

Example 2

A mixture of 100 g. of erythromycin in 200 ml. of toluene is stirred vigorously at reflux temperature in an apparatus similar to that described in Example 1. A warm solution of 100 g. of ethylene carbonate in 250 ml. of toluene is added to the stirred mixture during about one hour. Heating at reflux is continued for about 18 hours after all of the ethylene carbonate solution has been added. The reaction mixture is washed thoroughly with a warm aqueous 5 percent sodium chloride solution and then with water, and the toluene is removed under vacuum. Erythromycin carbonate is obtained from the residue as described in Example 1.

We claim:
1. A member of the group consisting of the antibiotic erythromycin carbonate and its acid addition salts, said antibiotic being a white crystalline solid melting at about 225–227° C. which is soluble in aromatic hydrocarbons, insoluble in aliphatic and cycloaliphatic carbons, and slightly soluble in water; which has one titratable group of pK'α 8.55 in 66 percent aqueous dimethylformamide; which has an optical rotation, $[\alpha]_D^{25}$, of about −53° (2 percent in dioxane); which has the approximate composition of 60.33 percent carbon, 8.78 percent hydrogen, 1.81 percent nitrogen, and 29.08 percent oxygen; which has a molecular weight as determined from mass spectrometric data, of about 760; and which in chloroform solution has the following observed values for the distinguishable bands in its infrared spectrum over the range of 2 to 15 microns: 2.88, 3.42, 3.45, 3.52, 3.58, 3.63, 5.59, 5.75, 6.89, 7.06, 7.27, 7.36, 7.55, 7.77, 7.86, 8.2, 8.65, 9.08, 9.23, 9.54, 9.78, 9.93, 10.03, 10.42, 10.66, 10.75, 10.87, 11.15, 11.30, 11.50, 11.85, and 12.04 microns.
2. Erythromycin carbonate as defined in claim 1.
3. The acid adidtion salts of the antibiotic defined in claim 1.
4. A method of producing the antibiotic defined in claim 1 which comprises reacting erythromycin with ethylene carbonate in an inert solvent medium for a time sufficient to convert the erythromycin to erythromycin carbonate.
5. The method of claim 4 in which an alkali metal base is added to the reaction medium in order to accelerate the reaction.
6. The method of claim 5 wherein the alkali metal base is potassium carbonate.
7. The method of claim 4 in which the reaction is accelerated by the addition of an alkali metal cyanide, cyanate, thiocyanate, chloride, bromide, or iodide.
8. The method of claim 5 in which the solvent medium is benzene and the alkali metal base is potassium carbonate.
9. The method of claim 8 is in which the reaction mixture is heated under reflux for about one hour.

References Cited

UNITED STATES PATENTS 3,040,025   6/1962   Murphy _____ 260—210

LEWIS GOTTS, Primary Examiner.

J. B. BROWN, Assistant Examiner.

U.S. Cl. X.R.

167—65